(12) United States Patent
Ueyoko

(10) Patent No.: US 6,478,064 B1
(45) Date of Patent: Nov. 12, 2002

(54) HEAVY DUTY RADIAL TIRE WITH CHAFER HEIGHT GREATER THAN BEAD APEX HEIGHT

(75) Inventor: Kiyoshi Ueyoko, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/310,343

(22) Filed: May 12, 1999

(30) Foreign Application Priority Data

May 15, 1998 (JP) .......................................... 10-133660
Jun. 2, 1998 (JP) .......................................... 10-152878

(51) Int. Cl.$^7$ ......................... B60C 15/00; B60C 15/06; B60C 15/024; B60C 13/00
(52) U.S. Cl. ...................... 152/543; 152/525; 152/539; 152/546; 152/548; 152/551; 152/555; 152/556; 156/110.1
(58) Field of Search ................................ 152/546, 555, 152/556, 543, 548, 539, 551, 525; 156/110.1

(56) References Cited

U.S. PATENT DOCUMENTS 5,885,388 A * 3/1999 Ueyoko et al. ......... 152/546 X

FOREIGN PATENT DOCUMENTS

EP 0 798 139 A2 * 10/1997 ................. 152/546
JP A9263113 10/1997

* cited by examiner

Primary Examiner—Adrienne C. Johnstone
(74) Attorney, Agent, or Firm—Birch, Stewart, Kolasch & Birch, LLP

(57) ABSTRACT

A heavy duty radial tire comprises: a carcass ply turned up around a bead core in each bead portion from the inside to outside of the tire so as to form a pair of turnup portions and a main portion therebetween; a bead apex rubber disposed between each of the turnup portions and the main portion, each. of the turnup portions extending radially outwardly beyond a radially outer end of the bead apex to adjoin the main portion; a chafer rubber disposed along at least an axially outer surface of each of the bead portions so as to define at least a flange-contacting part for contacting with a flange of a wheel rim; the height of the radially outer end of the bead apex being in the range of from 7 to 35% of the height of the carcass at the tire equator and being less than the height of the radially outer end of the chafer rubber; and the flange-contacting part being devoid of a concave profile. When the carcass ply is made of steel cords whose sectional area is in the range of from 0.10 to 0.25 sq.mm, a carcass reinforcing layer is disposed along the carcass so as to extend at least between the maximum tire width points and the edges of a belt disposed radially outside the carcass in the tread portion.

15 Claims, 8 Drawing Sheets

HEAVY DUTY RADIAL TIRE WITH CHAFER HEIGHT GREATER THAN BEAD APEX HEIGHT

BACKGROUND OF THE INVENTION

1. Field of the Invention

The present invention relates to a pneumatic tire, more particularly to a heavy duty radial tire improved in bead durability without increasing the tire weight.

2. Description of Prior Art

In heavy duty radial tires for trucks, buses and the like, hitherto, in order to increase the bead durability, as shown in FIG. 10, a bead apex rubber (b), which is disposed between a main portion (a1) and turnup portion (a2) of a carcass, was increased in the volume to increase the rigidity of the bead portion, and thereby the deformation of the tire under load is decreased.

Further, in order to even the contact pressure between the bead portion and a flange of a wheel rim, the bead portion is provided on the axially outer surface with a concave part accommodated to the curved inner surface of the rim flange. Such a conventional bead structure is shown, for example, in the laid-open Japanese patent application No. JP-A-9-263113.

In recent years, a technique in which the volume and height of the bead apex rubber are considerably decreased has been proposed. In this technique (hereinafter slim bead structure), as the bead apex rubber thickness is decreased, the thickness of a chafer rubber (d) disposed axially outside the bead apex rubber (b) is relatively increased. This is preferable per se because this is particularly effective to increase the bead rigidity against axially outward bending.

However, if a tire having such a slim bead structure is provided with the above-mentioned concave part (e) as shown in FIG. 9, the bead durability is liable to decrease because, during vulcanizing the tire in a mold, the chafer rubber (d) is pressed by a protrusion of the mold provided for forming the concave part, and the axially outside part of the chafer rubber (d) flows radially outwards. As a result, the boundary (k) between the chafer rubber (d) and the sidewall rubber (f) undulates, and the bead durability is decreased and the rigidity distribution is disturbed.

Further, it was found that even when the concave part (e) is not formed, the same problem—undulations of the boundary—arises, if a bead core (c) is moved axially outward during vulcanizing the tire, and the under part of a chafer rubber (d) is pushed and thus flows radially outwards as shown in FIG. 8. Also it was found that such a movement is closely related with the inclination angle of the axially outer surface of the bead portion near the bead heel, more particularly, the inclination angle during vulcanizing the, tire.

SUMMARY OF THE INVENTION

Therefore, an object of the present invention is to provide a heavy duty radial tire based on a slim bead structure, in which undulations of the boundary between a chafer rubber and a sidewall rubber are effectively prevented to improve the bead durability, without hindering a tire weight reduction.

In a slim bead structure, on the other hand, as the volume of the bead apex is decreased, above the bead core, a carcass ply turnup portion is curved steeper than ever. As a result, during building a raw tire, an air gap is liable to be formed between the carcass ply turnup portion and a bead apex rubber by spring-back of the carcass cords. This also greatly decreases the bead durability.

Therefore, another object of the present invention is to provide a heavy duty radial tire based on a slim bead structure, in which the occurrence of air gap effectively is prevented to improve the bead durability.

According to one aspect of the invention, a heavy duty radial tire comprises a tread portion, a pair of sidewall portions, a pair of bead portions with a bead core therein, a carcass comprising a ply of cords extending between bead portions and turned up around a bead core in each bead portion from the inside to outside of the tire so as to form a pair of turnup portions and a main portion therebetween, a bead apex rubber disposed between each of the turnup portions and the main portion, each of the turnup portions extending radially outwardly beyond a radially outer end of the bead apex to adjoin the main portion, a chafer rubber disposed along at least an axially outer surface of each of the bead portions so as to define at least a flange-contacting part for contacting with a flange of a wheel rim, the height of the radially outer end of the bead apex being in the range of from 7 to 35% of the height of the carcass at the tire equator, and being less than the height of the radially outer end of the chafer rubber, the flange-contacting part being devoid of a concave profile.

In order to achieve the second object, the above-mentioned cords of the carcass ply are steel cords whose sectional area is in the range of from 0.10 to 0.25 sq.mm, and a carcass reinforcing layer is disposed along the carcass so as to extend between at least the maximum tire width points and the edges of a belt disposed radially outside the carcass in the tread portion.

DETAILED DESCRIPTION OF THE INVENTION

Figure 1:
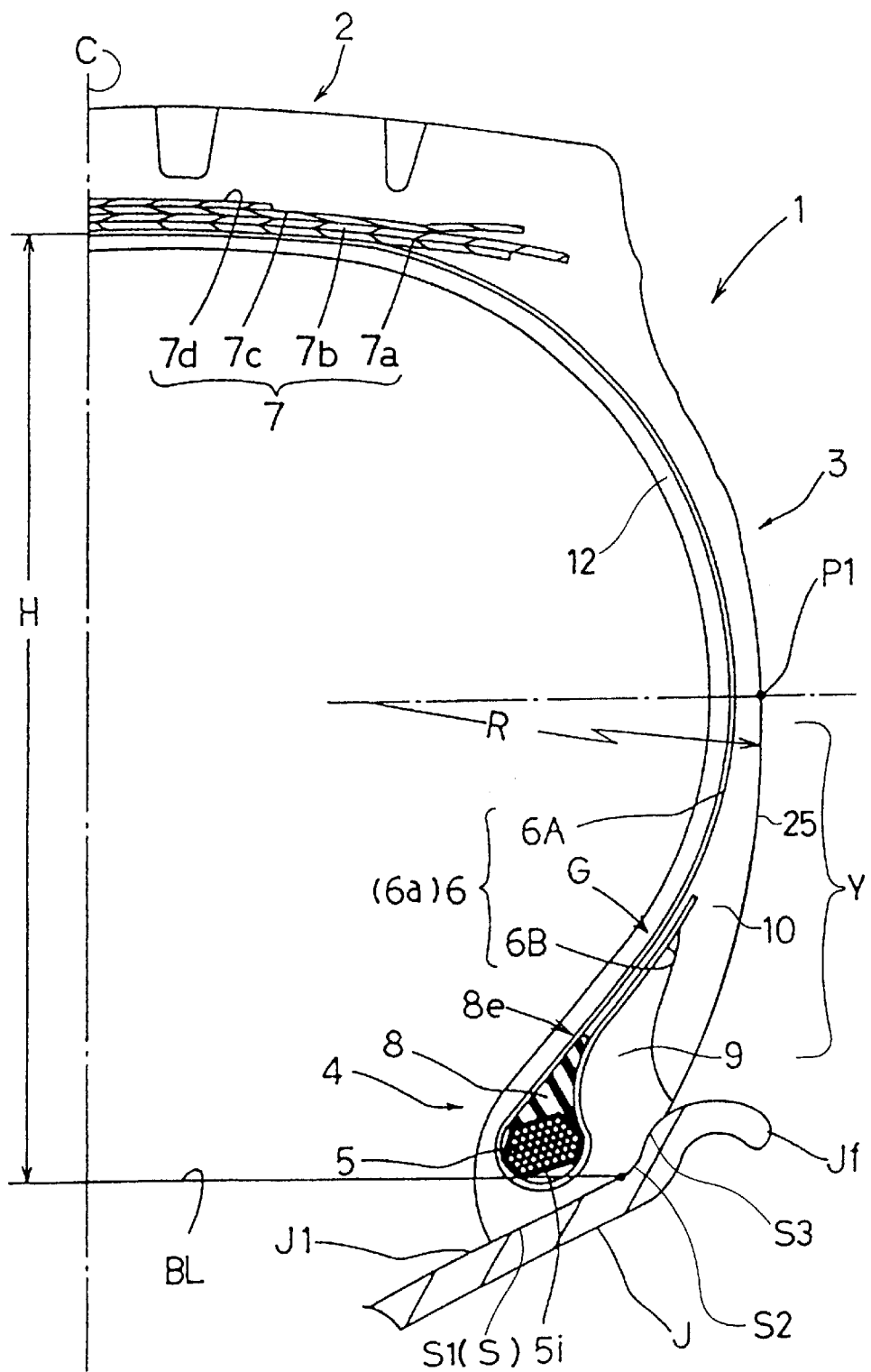
FIG. 1 is a cross sectional view of an embodiment of the present invention.

In the drawings, heavy duty tire 1 according to the present invention comprises a tread portion 2, a pair of axially spaced bead portions 4, a pair of sidewall portions 3 extending therebetween, a bead core 5 disposed in each bead portion 4, a carcass 6 extending between the bead portions 4, and a belt 7 disposed radially outside the carcass 6 in the tread portion 2.

Figure 7:
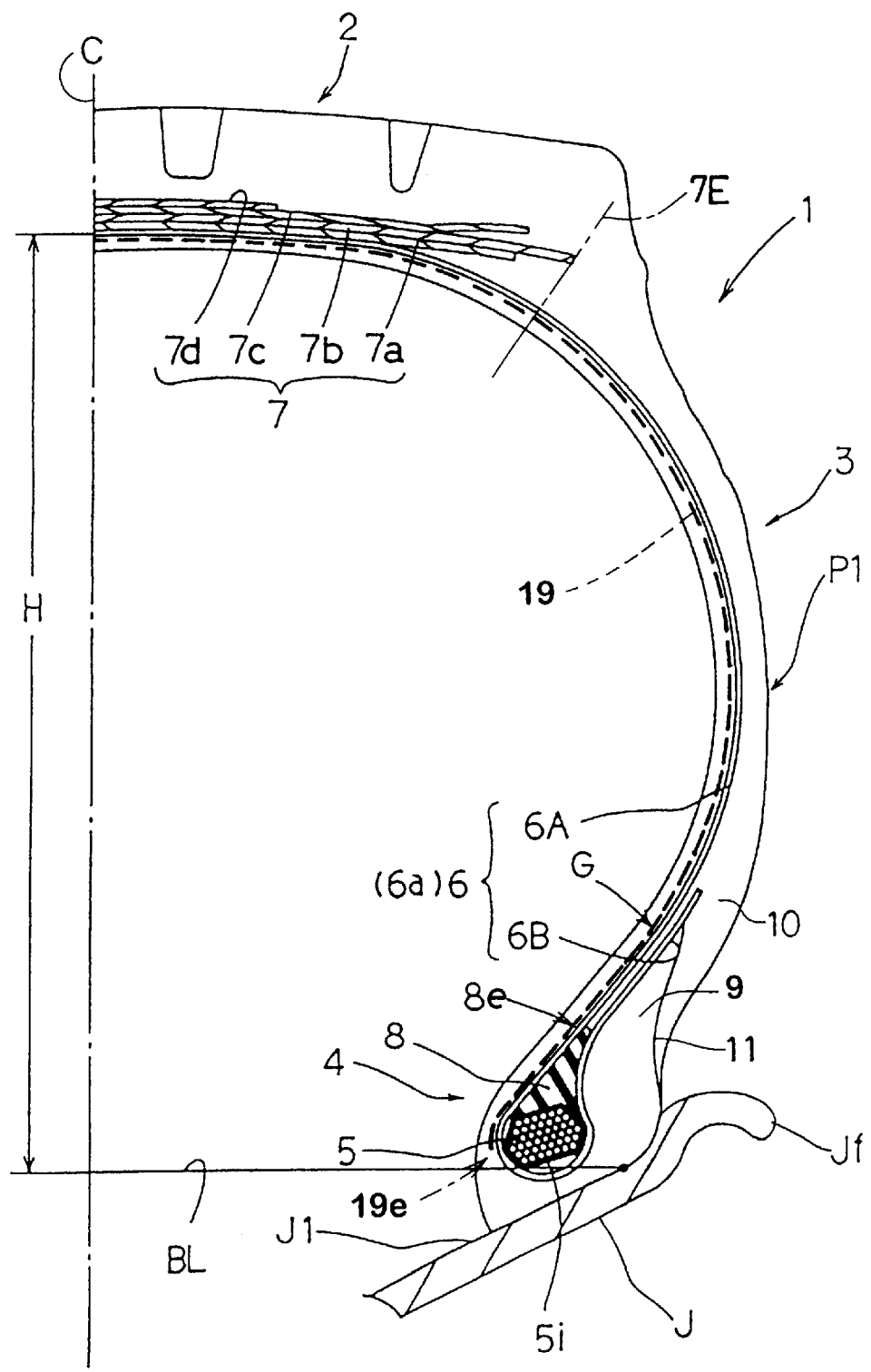
FIG. 7 is a cross sectional view of another embodiment of the present invention.
Figure 8:
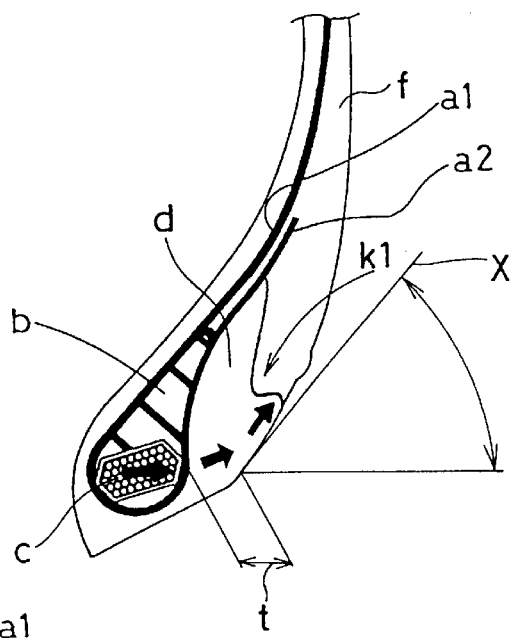
FIGS. 8 and 9 are schematic cross sectional views for explaining the problems in a slim bead apex rubber.
Figure 9:
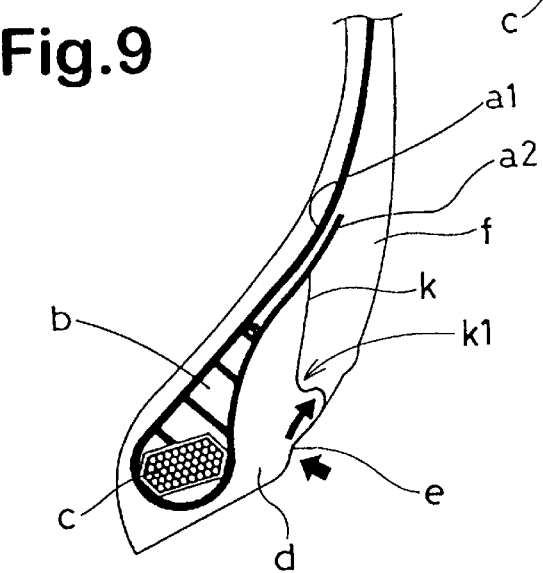

FIG. 1 and FIG. 7 each show a meridian section of a heavy duty radial tire 1 for trucks and buses according to the present invention which is mounted on a standard wheel rim J and inflated to a standard inner pressure but loaded with no tire load (hereinafter, standard unloaded state). Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In this invention, a "radial height" or "height" refers to a height measured radially from the bead base line BL under the standard unloaded state if not mentioned specifically. The bead base line BL is an axial line passing the bead heel points corresponding to the wheel;rim diameter.

The above-mentioned belt 7 comprises at least two cross breaker plies. For the belt cords, steel cords and organic fiber cords, e.g. nylon, aromatic polyamide, rayon and the like can be used.

In the embodiments shown in FIG. 1 and FIG. 7, the belt 7 is composed of four plies of parallel cords: a radially innermost first ply 7a of steel cords laid at an angle of from 50 to 70 degrees with respect to the tire equator C; and outer second-fourth plies 7b, 7c and 7d each made of steel cords laid at an angle of not more than 30 degrees with respect to the tire equator C.

The bead core 5 is made of at least one steel wire which is coiled a predetermined turns.

In the embodiments shown in FIG. 1 and FIG. 7, the sectional shape of the bead core 5 is a polygon (for example, hexagon) of which radially inner side 5i is substantially parallel with the bead bottom S1 so as to become parallel with the rim seat J1 of the wheel rim J when the tire is mounted on the wheel rim J. The inclination angle of the inner side 5i under the mounted state is set in the range of from 10 to 17 degrees (in this example about 15 degrees) with respect to the tire axial direction.

When the bead apex rubber is very small, movements and bending deformation of the carcass ply under loads become relatively large, and the tension of the carcass cords is large. As a result, a large stress concentrates on contacting points with the bead core, and the carcass cords are liable to be cut.

Therefore, the bead core 5 is covered with a bead core cover made of a textile fabric and/or a rubber layer to prevent the carcass cords from direct contacting with the bead wire.

In case of a bead core cover made of textile fabric, the textile fabric is made of organic fiber yarn such as nylon, rayon, polyester and the like. Preferably, the yarn is relatively thin (for example, 940 dtex/2 to 1670 dtex/2) in comparison with the usual tire cords. It is possible to cover the bead core surface partially, but preferably, the textile fabric is wound around the bead core 5 in a single layer at least, preferably a double layer, so as to cover all the surface of the bead core 5.

In case of a bead cover made of rubber layer, the thickness thereof is set such that the minimum thickness of rubber between the bead core wire and the carcass cords is not less than 1.0 mm.

Incidentally, for the bead core 5, steel wire is preferably used as explained above, but high modulus organic materials such as aromatic polyamide may be used.

The above-mentioned carcass 6 comprises at least one ply 6a of radially arranged cords extending between the bead portions 4 through the tread portion 2 and sidewall portions 3 and turned up around the bead cores 5 from the axially inside to outside of the tire to form a pair of turnup portions 6B and a main portion 6A therebetween. For the carcass cords, steel cords and organic fiber cord, e.g. polyester, aromatic polyamide rayon, nylon and the like can be used.

In the embodiment shown in FIG. 1, The carcass 6 consists of a single ply 6a of steel cords arranged radially at an angle of from 70 to 90 degrees (in this example substantially 90 degrees) with respect to the tire equator C.

Between the carcass ply main portion 6A and turnup portion 6B in each of the bead portions 4, a bead apex 8 is disposed.

The bead apex 8 is made of a hard rubber having a JIS-A hardness of from 60 to 99 degrees, preferably 70 to 95 degrees and being tapered radially outwardly from the bead core 5. The radial height L1 of the radially outer end 8e thereof is set in the range of from 7 to 35%, preferably 7 to 20% (in this example about 13%) of the radial height H of the carcass 6 at the tire equator C. If the height L1 is less than 7%, it is difficult to manufacture such tire. If more than 35%, improvement in the tire weight and bead durability is nullified.

As to the profile of the bead apex 8 in a tire meridian section, the axially inner surface of the bead apex 8 on which the carcass ply main portion 6A abuts has a substantially straight profile, but the axially outer surface on which the carcass ply turnup portion 6B abuts has a concave profile.

As to the carcass ply main portion 6A, a part between a position at which the carcass ply main portion 6A contacts the bead core 5 and a position of the outer end 8e of the bead apex 8 is formed substantially straight.

On the other hand, the carcass ply turnup portion 6B extends radially outwardly along the axially outer convex surface of the bead apex 8, and then from the radially outer end 8e of the bead apex 8, extends along the carcass ply main portion 6A to form an adjoining part G in which the turnup portion 6B adjoins the main portion 6A.

Figure 2:
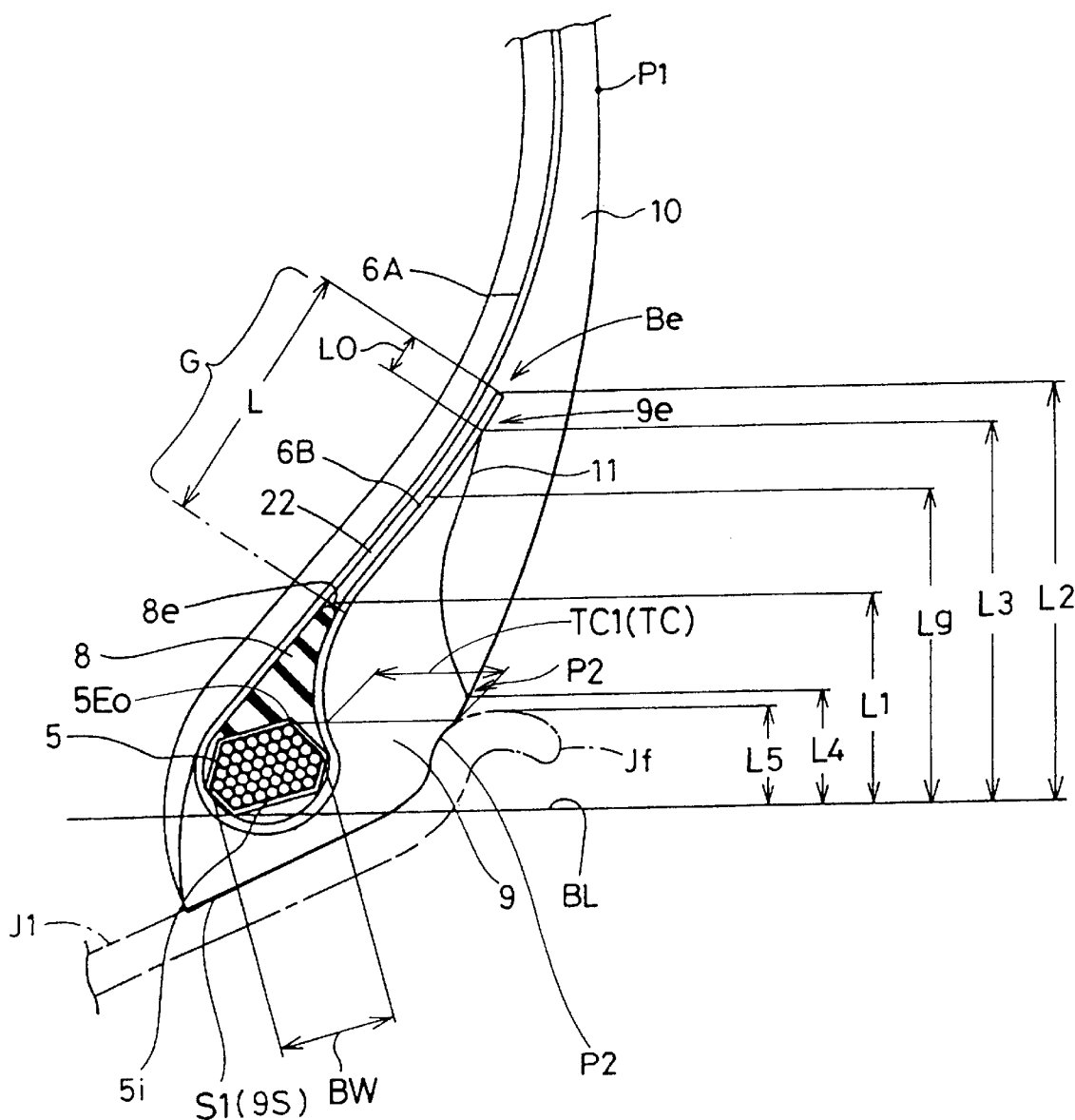
FIG. 2 is an enlarged cross sectional view of the bead portion thereof when the tire is mounted on a wheel rim.
Figure 3:
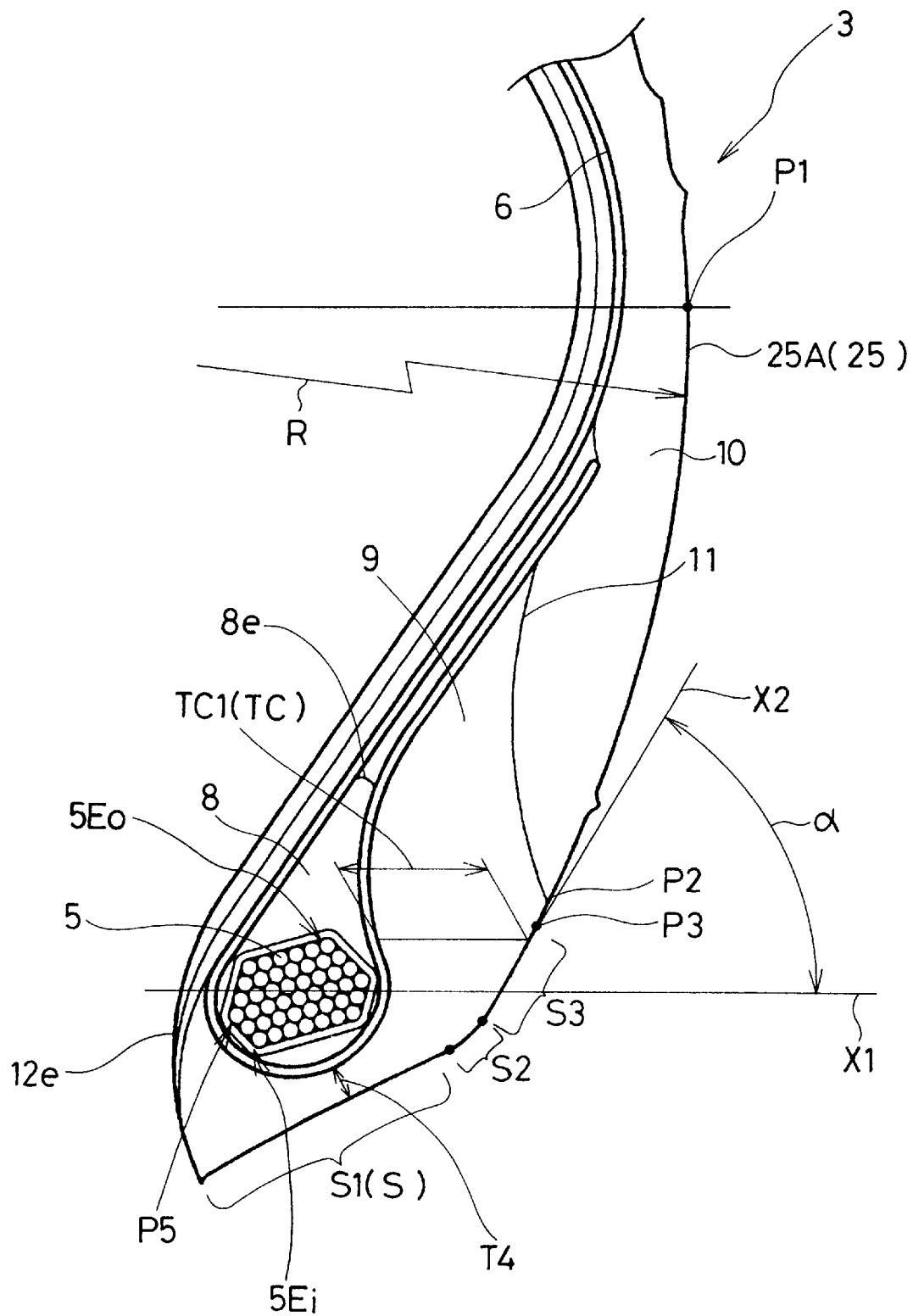
FIG. 3 is an enlarged cross sectional view of the bead portion showing its profile in a tire mold.

This adjoining part G has a length L in the range of from 0.5 to 5.0 times, preferably 1.0 to 4.0 times the maximum section width BW of the bead core 5 which occurs in the direction parallel to the bead bottom S1. Refer to FIG. 2 and FIG. 3.

The radially outer end Be of the adjoining part G or the turnup portion 6B has a radial height L2 of not more than 50% (in this example 44%) of the carcass height H, and is also radially inward of the maximum tire section width point P1.

In the adjoining part G, the thickness N of rubber 22 between the carcass cords 21 of the main portion 6A and those of the turnup portion 6B is set in the range of from 0.15 to 4.5 times, preferably 1.3 to 3.5 times the diameter K of the carcass cords 21 to mitigate shearing force therebetween. This rubber layer 22 can be a topping rubber for the carcass, but in this embodiment, a separate cushion rubber layer having the substantially same hardness as the carcass topping rubber is disposed between the main portion 6A and turnup portion 6B.

If the length L is less than 0.5 times the bead core width BW, the bead durability decreases. If the length L exceeds 5.0 times the width BW, the bead durability is not improved any more, and the weight increases.

If the thickness N is less than 0.15 times the carcass cord diameter K, a separation failure is liable to occur. If the thickness N is more than 4.5 times the diameter K, the turnup portion 6B is liable to be broken due to buckling of the cords and the heat generation increases.

In each of the bead portions 4, a chafer 9 is disposed along the bottom surface and axially outer surface of the bead portion.

The chafer 9 is made of rubber having an elastic modulus higher than a sidewall rubber 10 disposed on the axially outside of the carcass. For example, the chafer rubber 9 has a 100% modulus of 55 to 75 kgf/sq.cm, and the sidewall rubber 10 has a 100% modulus of 10 to 20 kgf/sq.cm. If the 100% modulus of the chafer is less than 55 kgf/sq.cm, the rigidity of the bead portion becomes insufficient. If the 100% modulus of the chafer is more than 75 kgf/sq.cm, heat generation increases and the bead durability decreases. If the 100% modulus of the sidewall rubber is less than 10 kgf/sq.cm, it is difficult to protect the carcass 6 from external injury. If the 100% modulus of the sidewall rubber is more than 20 kgf/sq.cm, the sidewall portions lose suppleness, and cracks occur.

The chafer 9 (height L3) in FIG. 2 extends radially outwardly from the radially inside of the bead core 5, directly contacting the carcass ply turnup portion 6B, beyond the outer end 8e (height L1) of the bead apex 8, but does not extend beyond the outer end Be (height L2) of the turnup portion 6B. It is preferably for the bead rigidity that the chafer height L3 is more than the middle height Lg of the adjoining part G. (Thus, L1<L3<L2, preferably, L1<Lg<L3<L2).

Further, it is preferable for preventing chafer's separation from the carcass cords that the distance L0 between the chafer end 9e and the carcass turnup end Be is in the range of from 5 to 15 mm.

The chafer rubber 9 and the sidewall rubber 10 as shown in FIG. 2 are spliced such that the boundary 11 therebetween is defined by a smooth or gentle concave curve which generally inclines radially inwards from the carcass ply turnup portion 6B to the outer surface of the tire. Therefore, the axial thickness TC of the chafer rubber 9 gradually decreases radially outwards from the radially inner end P2 of the sidewall rubber 10, to the outer end 9e. However, the thickness Tc gradually increases radially outwards from the radially inside of the bead core 5 to the outer end 5Eo of the bead core 5 in this example to the end point P2. At the height of the outer end 5Eo of the bead core 5, the rubber thickness. TC1 is set in the range of from 0.5 to 2.0 times, preferably 0.7 to 1.5 times the maximum section width BW of the bead core 5, whereby a sufficient bead rigidity can be obtained. The total rubber thickness measured axially between the carcass ply turnup portion 6B and the outer surface of the tire becomes maximum near the outer end 8 of the bead apex 8.

Further, as shown in FIG. 2, the radially inner end P2 of the boundary 11 or the radially outer edge P2 of the chafer 9 on the tire outer surface is preferably positioned at a height L4 of from 1.2 to 2.5 times the higher L5 of the rim flange Jf. If the height L4 is less than 1.2 times thee rim flange height L5, the sidewall rubber 10 chafes fro the rim flange Jf when the tire deformation is large. If more than 2.5 times L5, heat generation from the chafer rubber increases, and cracks are liable to occur on the surface of chafer 9.

Furthermore, under the bead core, the minimum rubber thickness T4 between the carcass cords 21 and the bead bottom S1 is set in the range of from 1.0 to 5.0 mm. If the rubber thickness T4 is less than 1.0 mm, the chafer rubber 9 is liable to crack. If more than 5.0 mm, the engaging force between the tire and wheel rim decreases and the durability decreases.

In order to prevent the boundary 11 from undulating, the profile of the inside of a tire vulcanizing mold is specifically defined. As the mold inside profile corresponds to the profile of the tire which is not mounted on a wheel rim, the profile S of the bead portion 4 under such a free state is described according to FIG. 3.

The profile S of the bead portion 4 is made up of a profile S1 for he bead bottom contacting with the rim seat J1, a profile S2 for the bead heel, and a profile S23 for a part contacting with the rim flange Jf. (See FIGS. 1, 2 and 7).

The profile S1 is defined by a substantially straight line or a bent line composed of straight segments.

The profile S3 is defined by a curved line not having a concave part.

The profile S2 is defined by a curved convex line having a relatively small radius in comparison with the profile S3.

In this embodiment (FIG. 3), further, a concave part is not formed from the radially outer edge P3 of the profile S3 to the radially outer edge P2 of the chafer 9 on the tire outer surface. A sidewall lower part between the outer edge P3 and the maximum tire width point P1 is defined by a smoothly curved convex line 25. This convex line 25 may be a single-radius curve or a multi-radium curve.

On the other hand, it is also important to prevent the bead core 5 from being moved axially outwardly by high pressure applied to the inside of the tire during vulcanizing the tire in the mold. Therefor, in the mold, at the same radial position or height as the middle point between the outer end 5Eo and inner end 5Ei of the bead core 5, the inclination angle α of the profile S (FIG. 3) with respect to the axial direction is set to be not less than 55 degrees, preferably not less than 57 degrees, but not more than 65 degrees. In other words, the tire is vulcanized in the mold having a negative profile of the above-explained tire profile S. As a result, the axially outward movements of the bead core 5 during vulcanizing the tire and the resultant radially outward movement of the chafer rubber can be controlled to prevent undulation of the boundary. If the angle a less than 55 degrees, it is difficult to prevent the undulation. If more than 65 degrees, running performances such as steering stability and the like deteriorate.

On the other hand, as shown in FIG. 3, when the undulation of the boundary 11 is prevented, in other words, when the main cause of deterioration in the bead durability in a slim bead structure is eliminated, separation of the inner liner 12 becomes an issue, wherein the inner liner 12 is a gas-impermeable rubber—such as a butyl rubber containing at least 50 parts by weight of halogenated butyl rubber— disposed along the inside of the tire. It is necessary for preventing the separation that the inner liner 12 does not extend to below the bead core 5. Further, in order to prevent the inner liner 12 from being subjected to a strong shearing force by the wheel rim during rim-mounting, the radially inner end 12e of the inner liner 12 is preferably positioned above the bead toe and beside the axially inner end P5 of the bead core 5.

Comparative Test 1

Figure 4:
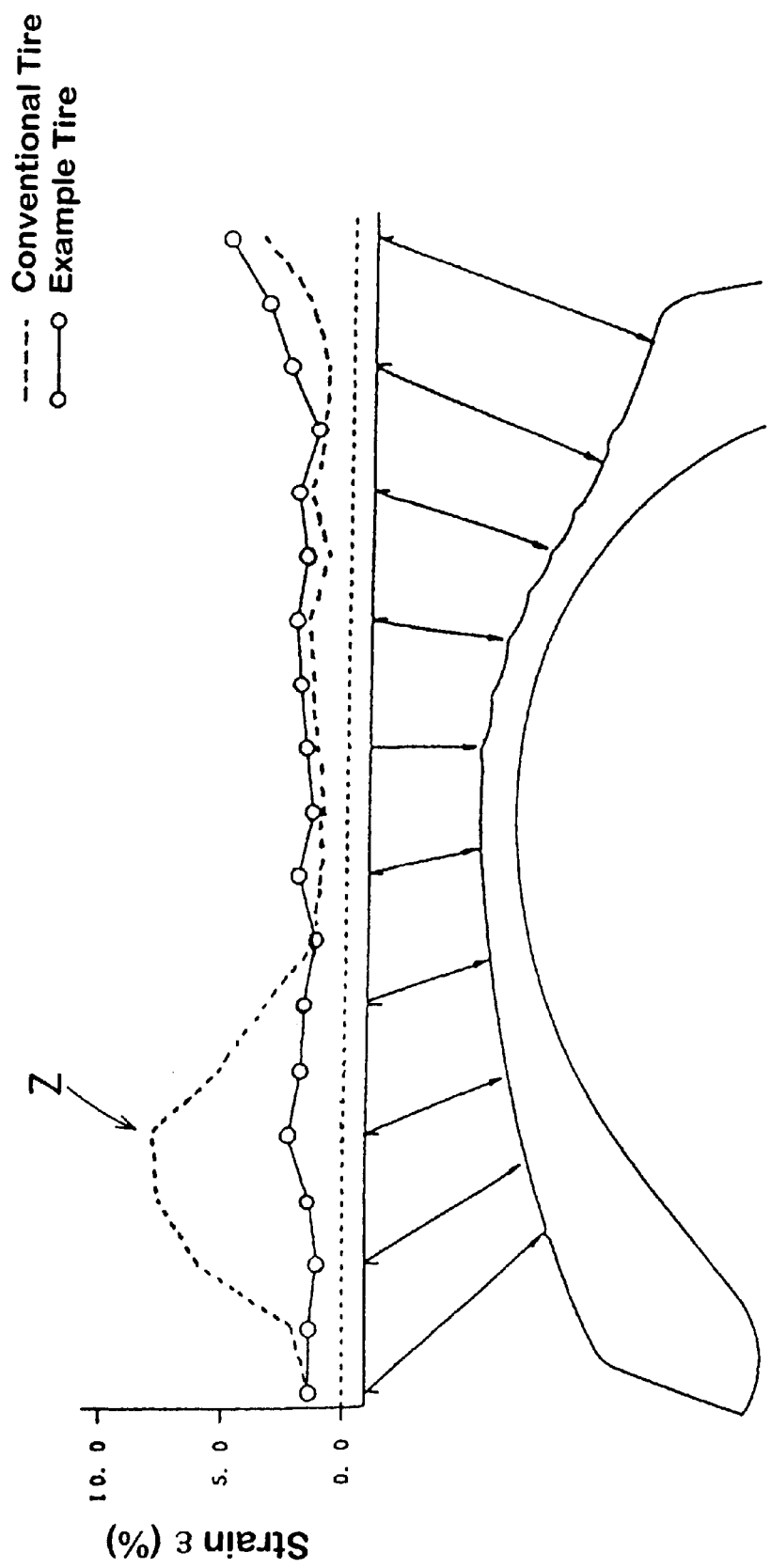
FIG. 4 is a diagram showing distributions of the maximum principal strain.
Figure 10:
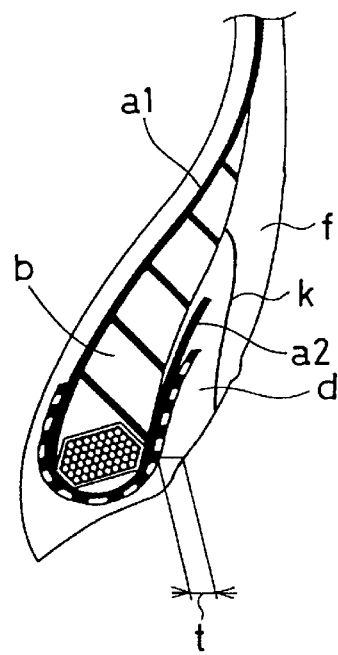
FIG. 10 is a schematic cross sectional view showing a conventional bead structure.

FIG. 4 shows maximum principal strain distributions of the tire shown in FIGS. 1–3 and a conventional tire shown in FIG. 10. As shown in FIG. 4, the conventional tire has a remarkable peak Z reaching to 7% or 8%, but the example tire has no peak and the maximum principal strain is decreased to less than 3.0%.

Like this, the tires according to the present invention are characterized in that, in a region from the maximum tire section width point P1 to the outer end P3 of the flange-contacting part S3, the maximum principal strain $\epsilon$ (%) when the tire pressure is increased from 50 kpa to a standard pressure does not have such a peak being over the value at the maximum tire section width point P1 by two or more points in percentage. Therefore, this region is prevented from being cracked, and bead damage therefrom can be prevented.

Figure 5:
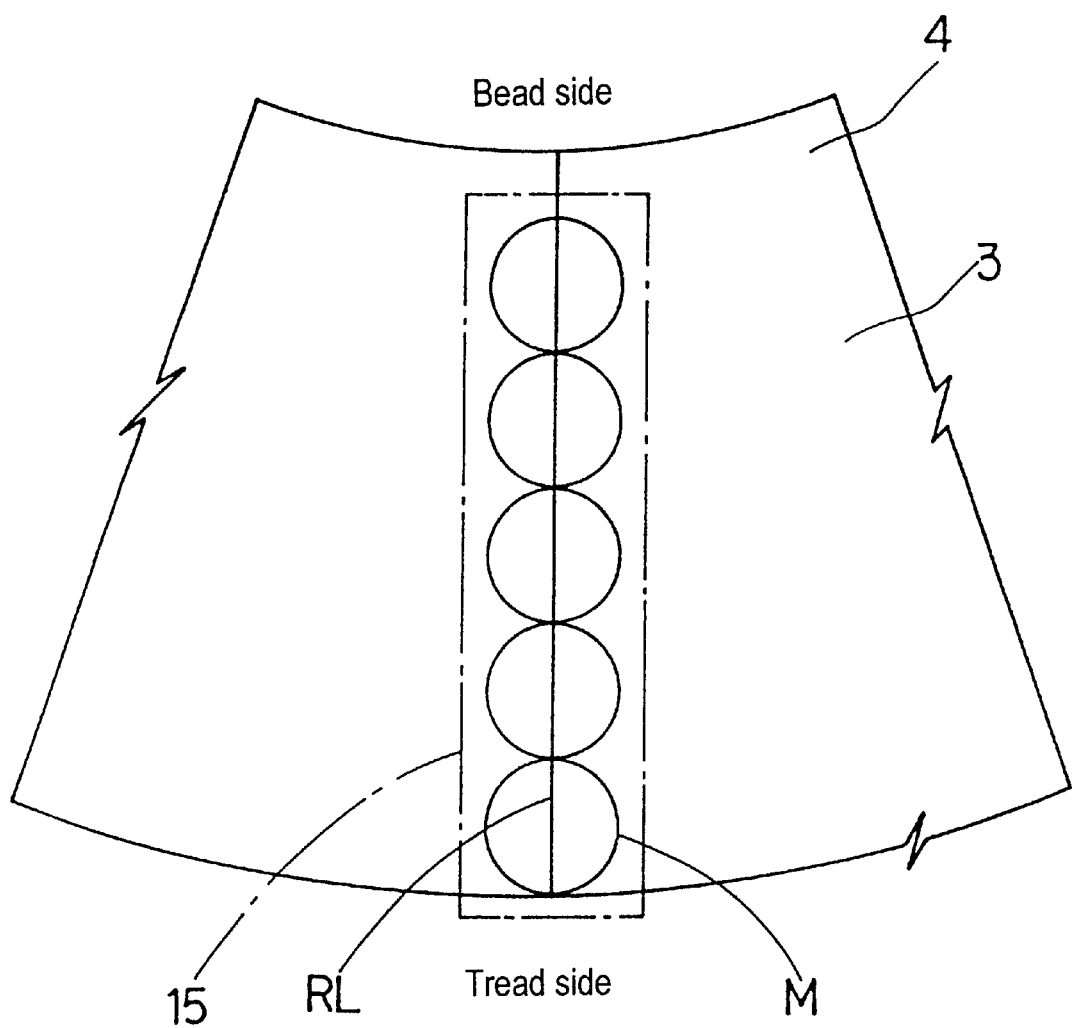
FIGS. 5 and 6 are diagrams for explaining a method of measuring the maximum principal strain.
Figure 6:
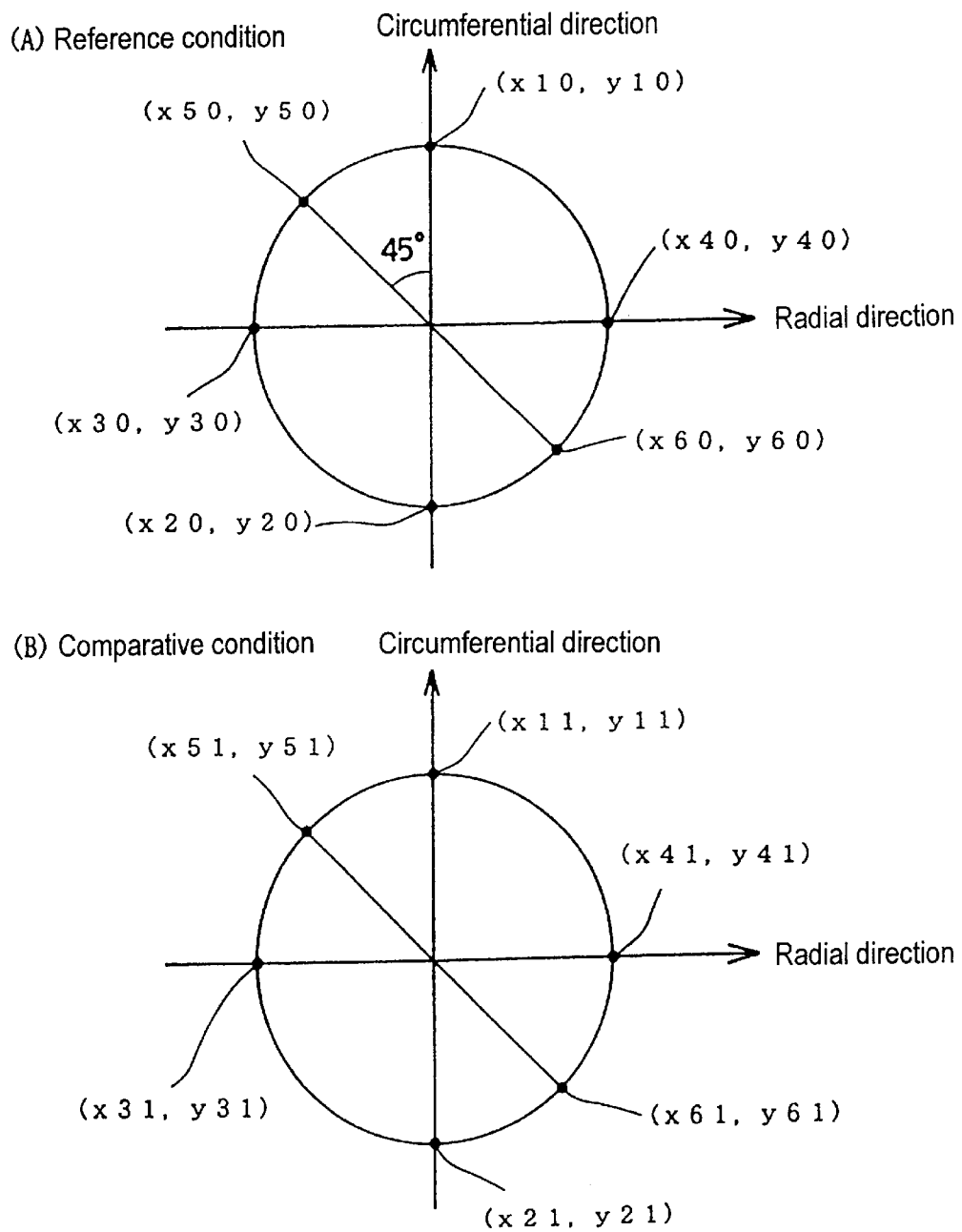

Incidentally, as shown in FIGS. 5 and 6, the maximum principal strain $\epsilon$ is measured as follows. First, the surface of the sidewall portion 3 and bead portion 4 of a test tire is buffed and washed with naphtha. A adhesive agent is applied to the buffed surface, and a radially extending measuring reference line RL is drawn. Markings or a series of circles in white ink (titanium oxide+DOP+castor oil) are copied onto a vinyl tape 15 by means of screen printing. Then, to copy the markings, the vinyl tape 15 is applied to the buffed surface of the test tire along the measuring reference line, wherein the tire is mounted on a regular rim and inflated to an inner pressure of 50 kpa. Further, after the tire is inflated to a regular inner pressure, the markings on the tire are copied to a blank tape. The markings (under the reference condition in which 50 kpa was applied, and the comparative condition in which the regular pressure was applied), obtained as explained above, are enlarged to measure each reference point shown in FIG. 6. The maximum: principal strain can be calculated from the following equations 1 to 11.

Equation 1: Under the reference condition, the circumferential length $$Lc0=\{(x10-x20)^2+(y10-y20)^2\}^{1/2}$$

Equation 2: Under the reference condition, the radial length $$Lr0=\{(x30-x40)^2+(y30-y40)^2\}^{1/2}$$

Equation 3: Under the reference condition, the length in a 135 degree direction $$L_{135}0=\{(x50-x60)^2+(y50-y60)^2\}^{1/2}$$

Equation 4: Under the comparative condition, the circumferential length $$Lc1=\{(x11-x21)^2+(y11-y21)^2\}^{1/2}$$

Equation 5: Under the comparative condition, the radial length $$Lr=\{(x31-x41)^2+(y31-y41)^2\}^{1/2}$$

Equation 6: Under the comparative condition, the length in a 135 degree direction $$L_{135}1=\{(x51-x61)^2+(y51-y61)^2\}^{1/2}$$

Equation 7: The circumferential strain $$\epsilon c=(Lc1-Lc0)/Lc0$$

Equation 8: The radial strain $$\epsilon r=(Lr1-Lr0)/Lr0$$

Equation 9: The strain in 135 degree direction $$\epsilon_{135}=(L_{135}1-L_{135}0)/L_{135}0$$

Equation 10: Searing strain $$\gamma=\epsilon c+\epsilon r-2X\epsilon_{135}$$

Equation 11: The maximum principal strain $$\epsilon=(\epsilon c\epsilon r)/2+\{(\epsilon c-\epsilon r)^2+\gamma^2\}^{1/2}/2$$

Comparative Test 2

Heavy duty radial tires of size 11R22.5 having the specifications given in Table 1 were prepared and tested for the bead durability and resistance to sidewall cracking.

Bead durability test: Using a tire test drum, the test tires were run for 10,000 km under the following conditions, and the running distance until any visible damage appeared was measured.

Running speed: 20 km/h

Tire load: 9000 kgf

Wheel rim: 8.25×22.5 standard rim

Inner pressure: 1000 kPa

In Table 1, as the bead durability, the running distance in km/10,000 km is indicated by an index based on the conventional tire being 100. The larger the value, the better the durability.

Crack resistance test: The test tires mounted on a 8.25×22.5 standard wheel rim and inflated to an inner pressure of 800 kPa were put in an ozone chamber for fourteen days under the following conditions. Then, external inspection was made if the sidewall surface was cracked. The results are shown in Table 1.

Ozone concentration: 50 pphm

Room temperature: 40 degrees C.

TABLE 1

| Tire | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ref. 1 | Conv. |
|---|---|---|---|---|---|---|---|---|---|---|---|---|---|
| Carcass | single ply of steel cords (3 × 0.20 + 7 × 0.23) | | | | | | | | | | | | |
| Cord angle | 90 degrees | | | | | | | | | | | | |
| Cord count | 38/5 cm (under bead core) | | | | | | | | | | | | |
| Height H | 135.8 mm | | | | | | | | | | | | |
| Belt | four plies of parallel steel cords (3 × 0.20 + 6 × 0.35) | | | | | | | | | | | | |
| Cord angle | +67, +18, −18 and −18 degrees (from the radially inside to outside) | | | | | | | | | | | | |
| Cord count | 26/5 cm | | | | | | | | | | | | |
| Bead core width BW | 15 mm | | | | | | | | | | | | |
| Length L (mm) | 49 | 56 | 27 | 49 | 49 | 49 | 49 | 49 | 49 | 49 | 49 | 49 | non |
| Height L1 (mm) | 27 | 20 | 47 | 27 | 27 | 27 | 27 | 27 | 27 | 27 | 27 | 27 | 74 |
| L1/H *100 (%) | 20 | 15 | 35 | 20 | 20 | 20 | 20 | 20 | 20 | 20 | 20 | 20 | 54 |
| Height L2 (mm) | 70 | 70 | 70 | 70 | 70 | 70 | 70 | 70 | 70 | 70 | 70 | 70 | 37 |
| Height L3 (mm) | 50 | 50 | 50 | 50 | 50 | 50 | 50 | 50 | 50 | 50 | 50 | 50 | 52 |
| Thickness TC1 (mm) | 17 | 17 | 17 | 7.5 | 7 | 25 | 17 | 17 | 17 | 17 | 17 | 17 | 6 |

TABLE 1-continued

| Tire | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ref. 1 | Conv. |
|---|---|---|---|---|---|---|---|---|---|---|---|---|---|
| TC1/BW | 1.13 | 1.13 | 1.13 | 0.5 | 0.47 | 1.67 | 1.13 | 1.13 | 1.13 | 1.13 | 1.13 | 1.13 | 1.13 |
| Thickness T4 (mm) | 3.5 | 3.5 | 3.5 | 3.5 | 3.5 | 3.5 | 3.5 | 3.5 | 3.5 | 0.5 | 6 | 3.5 | 2 |
| Concave part in Flange-contacting part | non | non | non | non | non | non | non | non | non | non | non | present | present |
| Inner liner under bead core | non | non | non | non | non | non | present | non | non | non | non | non | non |
| Inclination angle α (deg.) | 57 | 57 | 57 | 57 | 57 | 57 | 57 | 55 | 50 | 50 | 50 | 50 | 50 |
| Test Results | | | | | | | | | | | | | |
| Bead durability | 160 | 170 | 120 | 130 | 120 | 170 | 102 | 150 | 110 | 130 | 105 | 110 | 100 |
| Bead bottom crack | non | non | non | non | non | non | non | non | non | occurred | non | non | non |

FIG. 7 shows a modification of the carcass structure.

In the above-explained new bead structure in which the carcass ply turnup portion 6B is steeply curved along the bead apex 8, if thick steel carcass cords are used, due to their spring-back during making the tire, there is a possibility that an air gap is formed between the carcass ply turnup portion 6B and the bead apex rubber 8. In this embodiment, therefore, flexible carcass cords are used.

In order to avoid repetition, differences from the former embodiment will be described.

The carcass 6 comprises at least one ply 6a of cords 21 arranged radially at an angle in the range of from 60 to 90 degrees with respect to the tire equator C and turned up around the bead cores 5 from the inside to outside of the tire as explained in the former embodiment.

The carcass cords 21 in this example are a flexible thin steel cord whose sectional area is preferably in the range of from 0.10 to 0.25 sq.mm. The sectional area thereof is about one half of that in the former embodiment.

Former embodiment: 0.385 sq.mm (cord construction :3×0.20+7×0.23)

This embodiment: 0.172 sq.mm (45%) (cord construction :1×3/0.27)

Further, a steel amount is preferably set in the range of from 5.0 to 10.0 sq.mm, wherein the steel amount is defined as the product of the sectional area of a cord and the cord count per 5 cm ply width counted under the bead core.

This embodiment: 6.88 sq.mm

Former embodiment: 14.63 sq.mm

The length L of the adjoining part G of the carcass ply is set in the range of from 1.0 to 4.0 times the maximum section width BW of the bead core 5.

In this embodiment, a carcass reinforcing layer 19 is provided along the carcass 6.

The carcass reinforcing layer 19 is made of reinforcing cords 26 arranged radially at an angle of from 70 to 90 degrees with respect to the tire equator C. For the reinforcing cords 26, steel cords or organic fiber cords, e.g. nylon, polyester, rayon, aromatic polyamide and the like can be used. However, the materially and structurally same cord as the above-mentioned carcass cords 21 is preferably used. Further, in case of steel cords, it is preferable that the cord count is substantially same as that of the carcass ply 6a.

The carcass reinforcing layer 19 extends at least between the maximum tire section width point P1 and a belt end line 7E drawn normal to the carcass 6 from the edge of the belt 7. In FIG. 7, the carcass reinforcing layer 19 is disposed on the inside of the carcass 6 and extends between the bead portions 4 and is not turned up around the bead cores 5 so that the ends 19e thereof are located immediately axially inside the bead cores.

Further, at the tire equator CO, the thickness T2 of rubber between the reinforce cords 26 of the carcass reinforcing layer 19 and the carcass cords 21 is set in the range of from 1.0 to 4.0 times the diameter D2 of either the carcass cords 21 or the reinforce cords 26 which are not thicker than the other. And the thickness T1 of rubber between the carcass cords 21 and the belt cords 25 is set in the range of from 1.0 to 4.0 times the diameter D1 of either the carcass cords 21 or the belt cords 25 which are not thicker than the other.

Therefore, the strength of the tread portion 2 (such as plunger strength) is effectively improved by not only a direct contribution of the presence of the carcass reinforcing layer 19 but also a stress dispersing effect of the increased rubber thicknesses T1 and T2.

As a result, even if the total of the steel amount of the carcass ply 6a and that of the carcass reinforcing layer 19 is less than the steel amount of the former embodiment's carcass consisting of a single ply of thicker steel cords, it is possible to maintain a tire strength of the same level.

As to the extension of the carcass reinforcing layer 19, as explained above, it must be covered at least between the belt edges and the maximum tire width points P1. Thus, there are the following options: (a) extending continuously from one of the points P1 to the other or (b) breaking under the belt or between the belt edges; and (c) not turning up around the bead cores or (d) turning up around the bead cores from the inside to outside of the tire.

In case (c), it is possible (e) to terminate between the point P1 and the bead core 5 on the axially inside of the main portion of the carcass ply 6a, but it is preferable (f) to terminate beside the bead core as shown in FIG. 7.

In case (d), it is necessary (g) to terminate radially inside the radially outer end 8e of the bead apex 8, and it is preferable (h) to terminate beside the bead core.

In every case (a)–(d), it is possible to dispose the carcass reinforcing ply 19 along (i) the inside of the main portion of the carcass ply 6a as shown in FIG. 7 or (j) the outside of the main portion.

In the above-mentioned embodiments, the carcass cords 21 are steel cords, but organic fiber cords, e.g. nylon, polyester, rayon, aromatic polyamide and the like may be used.

Comparison Test 3

Heavy duty radial tires of size 11R22.5 having specifications shown in Table 2 were prepared and tested for the bead durability, steering stability, plunger strength, and tire weight.

Bead durability test: Same as above

Steering stability test: A ten-ton truck provided on all wheels with test tires was run on highways, and the test driver evaluated the tires with regard to steering response, rigidity, grip and the like.

Wheel rim: 8.25×22.5 standard wheel rim

Tire pressure: 800 kPa

The results are indicated by an index based on the conventional tire being 100. The larger the value, the better the steering stability.

Plunger strength test: According to a test procedure specified in Japanese Industrial Standard D4230, breaking energy was measured.

Wheel rim: 8.25×22.5 standard rim

Tire pressure: 800 kPa

The energy is indicated by an index based on the conventional tire being 100. The larger the value, the higher the strength.

Tire weight: In Table 2, the tire weights are indicated by an index based on the conventional tire being 100.

TABLE 2

| Tire | Ref. | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Carcass | single ply | | | | | | single ply | | | | | | | |
| Carcass cord | steel cords (3 × 0.20 + 7 × 0.23) | | | | | | steel cords (1 × 3/0.27) | | | | | | | |
| Cord angle and Cord count | 90 degrees and 38/5 cm | | | | | | 90 degrees and 40/5 cm | | | | | | | |
| Steel amount | 14.63 sq.mm | | | | | | 6.88 sq.mm | | | | | | | |
| Height H | 213 mm | | | | | | 213 mm | | | | | | | |
| Rubber thickness N (mm) | 1.38 | 1.08 | 1.08 | 1.08 | 1.08 | 1.08 | 1.08 | 1.08 | 0.06 | 2.76 | 1.08 | 1.08 | 1.08 | 1.08 |
| N/K | 1.8 | 1.8 | 1.8 | 1.8 | 1.8 | 1.8 | 1.8 | 1.8 | 0.1 | 4.6 | 1.8 | 1.8 | 1.8 | 1.8 |
| Length L (mm) | 45 | 45 | 45 | 45 | 45 | 45 | 13.5 | 61.5 | 45 | 45 | 45 | 45 | 45 | 45 |
| L/BW | 3 | 3 | 3 | 3 | 3 | 3 | 0.9 | 4.1 | 3 | 3 | 3 | 3 | 3 | 3 |
| Cracss reinforcing layer | non | | | | | | FIG. 7 | | | | | | | |
| Reinforcing cord | | | | | | | steel cord (1 × 3/0.27) | | | | | | | |
| Cord angle and Cord count | | | | | | | 80 to 90 degrees and 40/5 cm | | | | | | | |
| Steel amount | | | | | | | 6.88 sq.mm | | | | | | | |
| Height L1 mm | 45 | 21 | 21 | 21 | 21 | 21 | 21 | 21 | 21 | 21 | 21 | 45 | 21 | 21 |
| L1/H | 0.a21 | 0.1 | 0.1 | 0.1 | 0.1 | 0.1 | 0.1 | 0.1 | 0.1 | 0.1 | 0.1 | 0.21 | 0.1 | 0.1 |
| Height L3 mm | 65 | 65 | 65 | 65 | 65 | 65 | 65 | 65 | 65 | 65 | 20 | 65 | 65 | 65 |
| Chafer 100% modulus (kg/sq.cm) | 65 | 65 | 65 | 65 | 65 | 65 | 65 | 65 | 65 | 65 | 65 | 65 | 64 | 76 |
| Belt | | | | | | | four plies of steel cords (3 × 0.20 + 6 × 0.35) | | | | | | | |
| Cord angle and Cord count | | | | | | | +67, +18, −18, −18 (from inside to outside) and 26/5 cm | | | | | | | |
| Steel amount | | | | | | | 17.47 sq.mm | | | | | | | |
| Rubber thickness T1 (mm) | 0.5 | 1.8 | 0.54 | 2.46 | 1.8 | 1.8 | 1.8 | 1.8 | 1.8 | 1.8 | 1.8 | 1.8 | 1.8 | 1.8 |
| T1/D1 | 0.65 | 3 | 0.9 | 4.1 | 3 | 3 | 3 | 3 | 3 | 3 | 3 | 3 | 3 | 3 |
| Rubber thickness T2 (mm) | — | 1.8 | 1.8 | 1.8 | 0.54 | 2.46 | 1.8 | 1.8 | 1.8 | 1.8 | 1.8 | 1.8 | 1.8 | 1.8 |
| T2/D2 | — | 3 | 3 | 3 | 0.9 | 4.1 | 3 | 3 | 3 | 3 | 3 | 3 | 3 | 3 |
| Test results | | | | | | | | | | | | | | |
| Bead durability | 100 | 150 | 150 | 150 | 150 | 150 | 90 | 150 | 90 | 150 | 90 | 90 | 98 | 97 |
| Steering stability | 100 | 105 | 105 | 105 | 105 | 105 | 95 | 105 | 105 | 105 | 105 | 103 | 98 | 102 |
| Plunger strength | 100 | 120 | 103 | 120 | 105 | 120 | 120 | 120 | 120 | 120 | 120 | 120 | 120 | 120 |
| Tire weight | 100 | 95 | 94 | 99 | 94 | 100 | 92 | 98 | 94 | 100 | 95 | 97 | 95 | 95 |

What is claimed is:

1. A heavy duty radial tire comprising a tread portion, a pair of sidewall portions, a pair of bead portions with a bead core therein, a carcass comprising a ply of cords extending between the bead portions and turned up around a bead core in each bead portion from the inside to outside of the tire so as to form a pair of turnup portions and a main portion therebetween, and so that the minimum rubber thickness T4 between the bottom of the bead portion and the carcass cords is in the range of from 1.0 to 5.0 mm, a bead apex rubber disposed between each of the turnup portions and the main portion, each of the turnup portions extending radially outwardly beyond a radially outer end of the bead apex to adjoin the main portion, a chafer rubber having a 100% modulus of from 55 to 75 kgf/sq.cm and disposed along at least an axially outer surface of each of the bead portions so as to define at least a flange-contacting part for contacting with a flange of a wheel rim, the flange-contacting part being devoid of a concave profile, a sidewall rubber disposed in each bead portion and spliced to said chafer rubber to define a boundary between the chafer rubber and sidewall rubber, when the tire is mounted on a standard rim and inflated to a standard inner pressure but loaded with no tire load, the height of the radially outer end of the bead apex being in the range of from 7 to 35% of the height of the carcass at the tire equator, and being less than the height of the radially outer end of the chafer rubber, a rubber thickness measured axially from the outer surface of the tire to the carcass becoming maximum near the radially outer end of the bead apex, and at the radially outer end of the bead core, an axial thickness TC of the chafer rubber being in the range of from 0.7 to 1.5 times the maximum section width BW of the bead core, said boundary between the chafer rubber and the sidewall rubber having a radially inner end P2 positioned at a height L4 of from 1.2 to 2.5 times a radial height L5 of a flange of the rim, a sidewall lower part defined between the radially outer end P3 of the flange-contacting part and the maximum tire width point P1 having a smoothly curved convex profile.

2. The tire according to claim 1, wherein the axial thickness TC of the chafer rubber increases radially outwardly from the radially inside of the bead core to the radially outer end of the bead core, and the axial thickness TC1 at the outer end of the bead core is in the range of from 0.5 to 2.0 times the maximum section width BW of the bead core.

3. The tire according to claim 1, wherein, in a meridian section of the tire, the boundary between the sidewall rubber and the chafer rubber extends from the carcass to the outer surface of the tire, inclining radially inwardly and describing a smooth curve.

4. The tire according to claim 1, wherein an inner liner is disposed along the inside of the tire, and the inner liner terminates on the axially inside of the bead core in each of the bead portions.

5. A heavy duty radial tire comprising a tread portion, a pair of sidewall portions, a pair of bead portions with a bead core therein, a carcass comprising a ply of cords extending between the bead portions and turned up around a bead core in each bead portion from the inside to outside of the tire so as to form a pair of turnup portions and a main portion therebetween, a bead apex rubber disposed between each of the turnup portions and the main portion, each of the turnup portions extending radially outwardly beyond a radially outer end of the bead apex to adjoin the main portion, a chafer rubber disposed along at least an axially outer surface of each of the bead portions so as to define at least a flange-contacting part for contacting with a flange of a wheel rim, the flange-contacting part being devoid of a concave profile, when the tire is mounted on a standard rim and inflated to a standard inner pressure but loaded with no tire load, the height of the radially outer end of the bead apex being in the range of from 7 to 20% of the height of the carcass at the tire equator, and being less than the height of the radially outer end of the chafer rubber, the cords of the carcass ply being steel cords whose cross-sectional area is in the range of from 0.10 to 0.25 sq. mm, a cord-reinforced belt disposed radially outside the carcass in the tread portion, and a carcass reinforcing layer of cords disposed along the inside of the carcass so as to extend between the belt edges and the maximum tire width points at least.

6. The tire according to claim 5, wherein the carcass reinforcing layer extends between the maximum tire width points at least, and the thickness between the carcass cords and the reinforcing cords of the carcass reinforcing layer at the tire equator is 1.0 to. 4.0 times the diameter of either the carcass cord or the reinforcing cord which is not thicker than the other, and the thickness between the carcass cords and the belt cords at the tire equator is in the range of from 1.0 to 4.0 times the diameter of either the carcass cord or the belt cord which is not thicker than the other.

7. The tire according to claim 5, wherein the reinforcing cords are materially the same as the carcass cords.

8. The tire according to claim 5, wherein the carcass reinforcing layer extends to the axially inside of the bead core in each bead portion.

9. The tire according to claim 8, wherein the carcass reinforcing layer is not turned up around the bead cores.

10. The tire according to claim 5, wherein the cords of the carcass reinforcing layer are steel cords.

11. The tire according to claim 5, wherein the cords of the carcass reinforcing layer are aromatic polyamide cords.

12. The tire according to claim 5, wherein the cords of the carcass reinforcing layer are polyester cords.

13. The tire according to claim 5, wherein the cords of the carcass reinforcing layer are nylon cords.

14. The tire according to claim 5, wherein the cords of the carcass reinforcing layer are rayon cords.

15. A method of making a heavy duty radial tire comprising a tread portion, a pair of sidewall portions.

a pair of bead portions with a bead core therein, a carcass comprising a ply of cords extending between the bead portions and turned up around a bead core in each bead portion from the inside to outside of the tire so as to form a pair of turnup portions and a main portion there between, and so that the minimum rubber thickness T4 between the bottom of the bead portion and the carcass cords is in the range of from 1.0 to 5.0 mm, a bead apex rubber disposed between each of the turnup portions and the main portion, each of the turnup portions extending radially outwardly beyond a radially outer end of the bead apex to adjoin the main portion, a chafer rubber having a 100% modulus of from 55 to 75 kgf/sq.cm and disposed along at least an axially outer surface of each of the bead portions so as to define at least a flange-contacting part for contacting with a flange of a wheel rim, the flange-contacting part being devoid of a concave profile, a sidewall rubber disposed in each bead portion and spliced to said chafer rubber to define a boundary between the chafer rubber and sidewall rubber, when the tire is mounted on a standard rim and inflated to a standard inner pressure but loaded with no tire load, the height of the radially outer end of the bead apex being in the range of from 7 to 35% of the height of the carcass at the tire equator, and being less than the height of the radially outer end of the chafer rubber, a rubber thickness measured axially from the outer surface of the tire to the carcass becoming maximum near the radially outer end of the bead apex, and at the radially outer end of the bead core, an axial thickness TC of the chafer rubber being in the range of from 0.7 to 1.5 times the maximum section width BW of the bead core, said boundary between the chafer rubber and the sidewall rubber having a radially inner end P2 positioned at a height L4 of from 1.2 to 2.5 times a radial height L5 of a flange of the rim, a sidewall lower part defined between the radially outer end P3 of the flange-contacting part and the maximum tire width point P1 having a smoothly curved convex profile, the method comprising a step of vulcanizing the tire in a mold whose inside has a profile such that, the inclination angle α of the outer surface of the tire in the mold measured at the same radial position as the middle point between the radially outer end and the radially inner end of the bead core is not less than 55 degrees and not more than 65 degrees with respect to the axial direction.

\* \* \* \* \*